Figure 1:
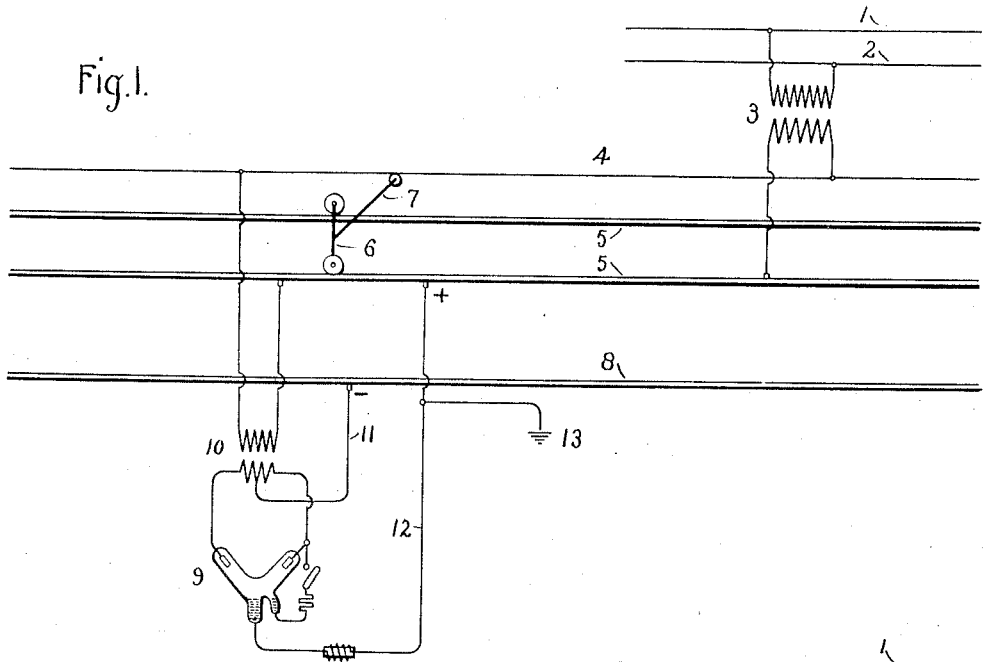

J. L. R. HAYDEN.
METHOD OF PREVENTING ALTERNATING CURRENT ELECTROLYSIS.
APPLICATION FILED JAN. 4, 1907.

1,010,907.

Patented Dec. 5, 1911.

Witnesses
J. Earl Ryan
J. Ellis Glen

Inventor:
Joseph LeRoy Hayden
By Albert G. Davis
Atty.

UNITED STATES PATENT OFFICE.

JOSEPH L. R. HAYDEN, OF SCHENECTADY, NEW YORK, ASSIGNOR TO GENERAL ELECTRIC COMPANY, A CORPORATION OF NEW YORK.

METHOD OF PREVENTING ALTERNATING-CURRENT ELECTROLYSIS.

1,010,907.  Specification of Letters Patent.  Patented Dec. 5, 1911.

Application filed January 4, 1907. Serial No. 350,852.

*To all whom it may concern:*

Be it known that I, JOSEPH LE ROY HAYDEN, a citizen of the United States, residing at Schenectady, county of Schenectady, State of New York, have invented certain new and useful Improvements in Methods of Preventing Alternating-Current Electrolysis, of which the following is a specification.

My invention relates to a method of and apparatus for preventing electrolysis of an alternating current electrode immersed in an electrolyte, as in the case of iron pipes, lead covered cables and similar articles buried in the earth and subjected to the action of an alternating current, such for example as leakage or stray current from an alternating current railway system. When such a pipe or cable buried in the earth is made a part of an alternating current circuit the positive half-wave of the current, during which current is flowing from the pipe or cable into the earth, tends to produce electrolytic corrosion of the pipe or cable, while the negative half-wave immediately following, during which current is flowing from the earth into the pipe or cable, tends to reverse or neutralize the electrolytic action of the preceding positive half-wave. The negative half-wave, however, does not entirely neutralize or overcome the effect of the positive half-wave, hence the cumulative action of the positive half-waves results in an electrolytic corrosion or wasting away of the pipe or cable, and the object of my invention is to counteract and completely neutralize the difference between the effects of the positive half-wave and of the negative half-wave so as to completely protect the cable or pipe.

My invention in its broadest aspect comprises a method of overcoming electrolytic corrosion by alternating currents, which consists in causing a greater amount of energy to flow into the electrode to be protected than flows out of it, whereby the electrolytic corrosion, caused by the positive half-waves of the alternating current, is completely overcome or neutralized.

My invention also consists of superimposing upon the alternating current, uni-directional current continuously flowing into the electrode to be protected, thereby completely overcoming or neutralizing the electrolytic corrosion due to the difference between the positive and negative half-waves of the alternating current, this result being preferably accomplished by making the electrode to be protected the cathode of the uni-directional current, the amount of uni-directional current ranging from just enough to neutralize the excess effect of the positive half-wave over the negative half-wave to an amount great enough to so modify the alternating current that the electrode to be protected is always at a negative potential.

My invention also comprises apparatus for carrying out this method, which consists essentially of means for making the negative half-wave of the alternating current enough greater than the positive half-wave to completely overcome and neutralize the electrolytic corrosion produced by the positive half-wave; of means for superimposing upon an alternating current a uni-directional current of a direction and intensity to overcome and neutralize completely the electrolytic effect of the alternating current; of means for causing a uni-directional current to flow between the earth and an alternating current electrode buried therein, so as to neutralize alternating current electrolysis, and of other features described in the specification and pointed out in the claims.

My invention will best be understood by reference to the accompanying drawing, in which—

Figure 2:
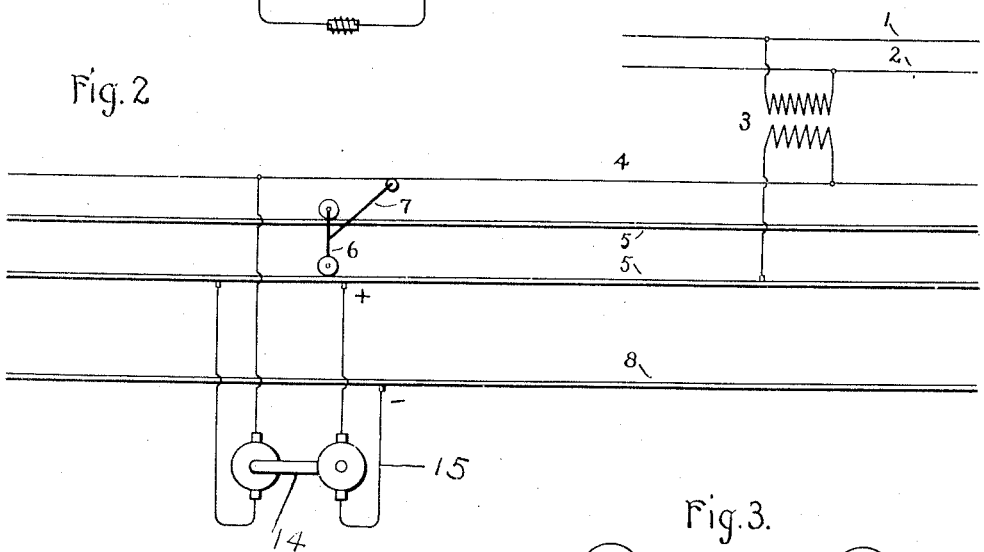
Figure 3:
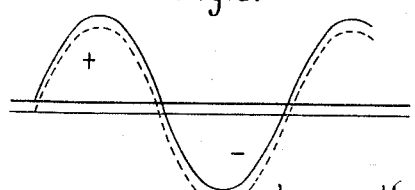

Figure 1 is a diagrammatic illustration of my invention applied to a street railway system; Fig. 2 is a diagrammatic illustration of a motor generator set applied to a street railway system to carry out my invention; and Fig. 3 is a diagram showing the alternating current with the uni-directional current superimposed thereon, the light horizontal line showing the constant potential, and the dotted line showing the form of the waves of the resultant current.

One embodiment of my invention is disclosed in Fig. 1 in which 1 and 2 represent an alternating current circuit which, through a transformer 3, supplies current to the trolley-wire 4 and rails 5 of a railway system. The car or locomotive 6, running upon the rails 5 takes current from the trolley wire 4 by means of the trolley 7. A pipe, lead covered cable, or similar article 8 is buried in the earth adjacent to the railway. It is found in practice that when current is flowing from the trolley wire 4 through the car or locomotive 6 to the rails 5, stray currents will flow through the earth between the railway and the pipe or cable 8 and thence back to where the transformer 3 is connected to the rails, these stray currents being great enough to cause electrolysis of the pipe or cable, the earth acting as an electrolyte and the pipe or cable acting as an electrode in an alternating current circuit.

In carrying out my invention I so change the relation between the positive half-waves of the alternating current flowing between the pipe or cable 8 and the rails 5, that the negative half-waves, during which current is flowing into the cable or pipe 8, represent a greater amount of energy than do the positive half-waves, during which current is flowing out of the pipe or cable 8 into the earth, whereby the electrolytic action of the positive half-waves is completely neutralized. One method of accomplishing this result is by superimposing upon the alternating current a small unidirectional current flowing from the earth or the rails 5 into the pipe or cable 8. Any source of unidirectional current, such as a mercury rectifier 9, supplied by a transformer 10 connected between the trolley 4 and the rails 5, has its negative pole connected to the pipe or cable 8 by means of a lead 11. Any other source of unidirectional current, such as a motor generator set 14 or a battery could be substituted for the rectifier as shown in Fig. 2 of the drawings. The negative pole of the rectifier is connected to the pipe or cable 8 through the lead 11, while the positive pole is connected to the rails 5 or to the ground by means of the lead 12, although either the connection to the rails 5 or the connection to the ground 13 may be omitted, either connection alone being sufficient to carry out my invention, while the negative pole of the motor generator set 14 may be connected through the lead 15 to the pipe or cable 8 to secure the same result as when the rectifier 9 is used.

The result of the arrangement shown in Figs. 1 and 2 is to cause the amount of energy of the waves flowing into the pipe or cable 8 to be greater than that of the waves flowing out of it, this result being secured by superimposing the small unidirectional current due to the difference of potential between the positive and negative poles of the source of unidirectional current upon the alternating current flowing between the pipe or cable 8 and the rails 5. The result of superimposing the unidirectional current upon the alternating current is to make the negative half-wave larger than the positive half-wave, and by properly proportioning the amount of unidirectional current to the amount of alternating current, the electrolytic action of the alternating current can be completely counteracted and neutralized. It is found that a uni-directional current amounting to 1.5% of the stray alternating current is sufficient to give practically complete protection against alternating current electrolysis, although in practice the uni-directional current is kept large enough to insure protection against the heaviest probable stray current, since the uni-directional current does no harm even though the stray alternating current is zero.

The alternating potential and current between the pipe and ground is measured in any well-known manner at various points under varying conditions, and the uni-directional potential is kept higher at those points where the difference of alternating potential between the pipe and ground is high than where it is low in order to make the uni-directional potential approximately proportional to the alternating potential which tends to produce a stray alternating current. The average amount of uni-directional current at any particular point is approximately a predetermined percentage of the average alternating current at that point, since the potential distribution in the ground in a railway system varies but little with the location of the individual cars, and any increase in stray current at any particular point, due to a car passing that point, is slight and of very short duration.

My invention may be carried out in many other ways than that disclosed and described, and I therefore do not wish to be restricted to the particular disclosure contained in this specification, but intend to cover by the claims all changes and modifications which are within the spirit and scope of my invention.

What I claim as new and desire to secure by Letters Patent of the United States, is,—

1. The method of preventing electrolysis of metal buried in the earth and forming part of an alternating current circuit through the earth which consists in causing a greater flow of energy in the alternating current circuit in a direction to prevent electrolysis of the metal than in the other direction.

2. The method of preventing electrolysis of metal buried in the earth and forming part of an alternating current circuit through the earth which consists in causing more flow of energy in the alternating current circuit during the negative half wave than during the positive half wave.

3. The method of preventing electrolysis of metal buried in the earth and forming part of an alternating current circuit through the earth which consists in superimposing upon the alternating current a unidirectional current between the earth and the metal in a direction to counteract the electrolytic action of the alternating current.

4. The method of preventing electrolysis of metal buried in the earth and forming part of an alternating current circuit thorugh the earth which consists in making said metal the cathode for a unidirectional current between the metal and the earth.

5. The combination with a metal object buried in the earth and forming part of an alternating current circuit through the earth, whereby said metal object is electrolytically corroded by the flow of current in said circuit, of means for causing the flow of energy in said circuit in a direction to prevent electrolysis of said metal to be greater than the flow in the other direction.

6. The combination with a metal object buried in the earth an dforming part of an alternating current circuit through the earth, whereby said metal object is electrolytically corroded by'the flow of current in said circuit, of means for causing unidirectional current to flow into said metal from the earth to counteract the electrolytic effect of the alternating current upon said metal.

7. The combination with a metal object buried in the earth and forming part of an alternating current circuit through the earth, whereby said metal object is electrolytically corroded by the flow of current in said circuit, of means for supplying unidirectional current between said metal and the earth and connections whereby said metal is made the cathode of a unidirectional current and thereby electrolysis is prevented.

8. The combination with a metal object buried in the earth to form part of an alternating current circuit through the earth, whereby said metal object is electrolytically corroded by the flow of current in said circuit, of means for causing a greater amount of energy to flow into the metal from the earth during the negative half wave of the alternating current than flows out of the metal during the positive half wave.

9. The combination with a conductor, an alternating current generator connected to said conductor and a metal object buried in the earth and forming part of the return circuit through the earth from said conductor to said generator, of a source of supply of unidirectional current between said metal object and the earth, and a connection between the negative pole of said source and said metal object for preventing electrolysis of said metal.

10. The combination with a conductor, an alternating current generator connected to said conductor and a metal object buried in the earth and forming part of the return circuit through the earth from said conductor to said generator, of a source of unidirectional current having its positive pole grounded in the earth and its negative pole connected to said metal object whereby unidirectional current is supplied between said metal object and the earth in a direction to prevent electrolysis of said metal.

In witness whereof, I have hereunto set my hand this 2nd day of January, 1907.

JOSEPH L. R. HAYDEN.

Witnesses:
BENJAMIN B. HULL,
HELEN ORFORD.